United States Patent [19]

Smith et al.

[11] Patent Number: 4,835,351
[45] Date of Patent: May 30, 1989

[54] OVEN HUMIDITY RESERVOIR

[75] Inventors: Donald P. Smith, 4630 Woodfin Dr., Dallas, Tex. 75220; William W. Plumb, Dallas; Jarald E. High, Grand Prairie, both of Tex.

[73] Assignee: Donald P. Smith, Dallas, Tex.

[21] Appl. No.: 218,502

[22] Filed: Jun. 23, 1988

Related U.S. Application Data

[63] Continuation of Ser. No. 90,413, Aug. 26, 1987, abandoned, which is a continuation of Ser. No. 787,524, Oct. 15, 1985, abandoned.

[51] Int. Cl.$^4$ ............................................. H05B 6/80
[52] U.S. Cl. ...................... 219/10.55 R; 219/10.55 B; 219/400; 99/325; 99/474; 99/487
[58] Field of Search ................ 219/10.55 B, 10.55 A, 219/10.55 R, 10.55 E, 400, 401; 99/330, 325, 474, 475, 487, 516, 527, DIG. 14; 426/523, 233

[56] References Cited

U.S. PATENT DOCUMENTS

| | | | |
|---|---|---|---|
| 3,424,231 | 1/1969 | Truhan | 219/400 |
| 3,825,723 | 7/1974 | Roeser | 219/401 |
| 4,189,995 | 2/1980 | Löhr et al. | 99/475 X |
| 4,307,286 | 12/1981 | Guibert | 219/400 |
| 4,409,453 | 10/1983 | Smith | 219/10.55 A |
| 4,426,923 | 1/1984 | Ohata | 219/400 X |
| 4,454,404 | 6/1984 | Zushi | 219/10.55 R X |

Primary Examiner—Philip H. Leung
Attorney, Agent, or Firm—Crutsinger & Booth

[57] ABSTRACT

An oven comprising a cabinet having a plurality of cooking cavities; air recirculating units for circulating air through each cooking cavity; humidity control apparatus for controlling humidity of air circulated through the cavity. Programmable controls regulate air flow through the recirculating units to provide controlled pulses of air of controlled temperature and humidity to provide a desired surface moisture content.

22 Claims, 15 Drawing Sheets

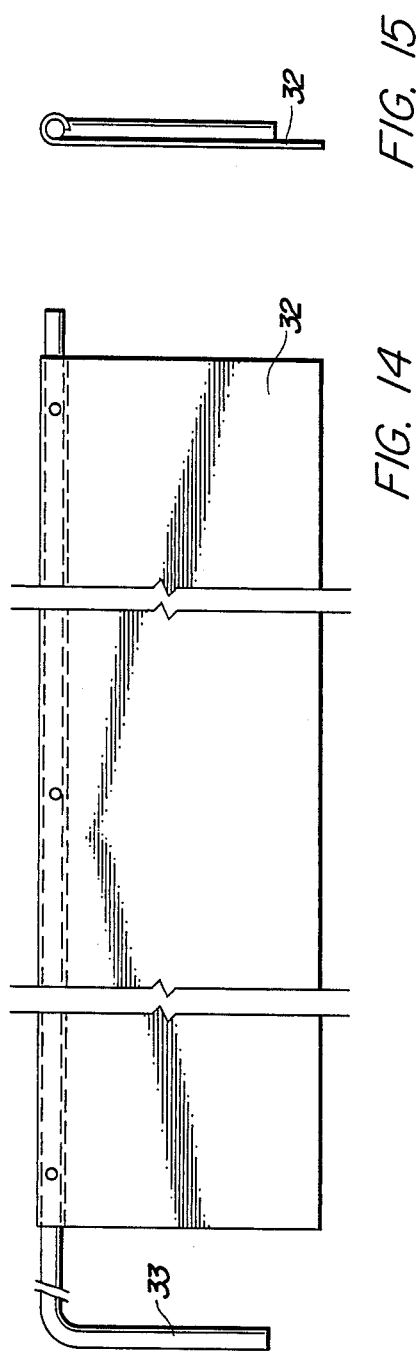

OVEN HUMIDITY RESERVOIR

This is a continuation of application Ser. No. 07/090,413 filed Aug. 26, 1987 which is a continuation of application Ser. No. 06/787,524 filed Oct. 15, 1985, both abandoned.

BACKGROUND OF INVENTION

This application relates to improvements in ovens for cooking food products.

SUMMARY OF INVENTION

The oven hereinafter more fully described and illustrated in the attached drawings comprises multi-cooking cavities isolated one from the other, each cavity being provided with a microwave heating unit, an air circulating unit, and a hot plate unit. The air circulating unit is provided with a humidity control for controlling the moisture content of air circulated into the cooking cavities. The air circulating unit is further controlled to permit adjustment of the volume of air delivered to each cavity and to terminate flow to each cavity for permitting the flow of air to be "pulsed".

The multiple cavities through which air can be constantly recirculated provides a reservoir of moist air such that an item of food having a temperature below the dew point of the moist air will receive condensation of moisture from the heated air. The condensation of moisture onto the surface of the product is much more effective than it would be if only a small volume of warm moist air were available. By controlling the temperature, moisture content and volume of air flowing across the surface of the food product after moisture has condensed onto the surface of the product, the heating rate and surface texture of the food product can be controlled. The surface can be dried, crisped and browned by intensive air jet impingement. If the moist surface is desired, the recirculating air can be pulsed to supply moderately heated air to supply heat necessary to warm the interior of the product but not sufficient to dry the surface of the product.

DESCRIPTION OF DRAWING

Drawings of a preferred embodiment of the invention are annexed hereto so that the invention may be better and more fully understood, in which:

FIG. 14 is a front elevational view of a gate to be mounted in the plenum for controlling air flow to an air circulating unit;

FIG. 15 is a side elevational view of the gate illustrated in FIG. 14;

Numeral references are employed to designate like parts throughout the various figures of the drawing.

DESCRIPTION OF A PREFERRED EMBODIMENT

Figure 1:
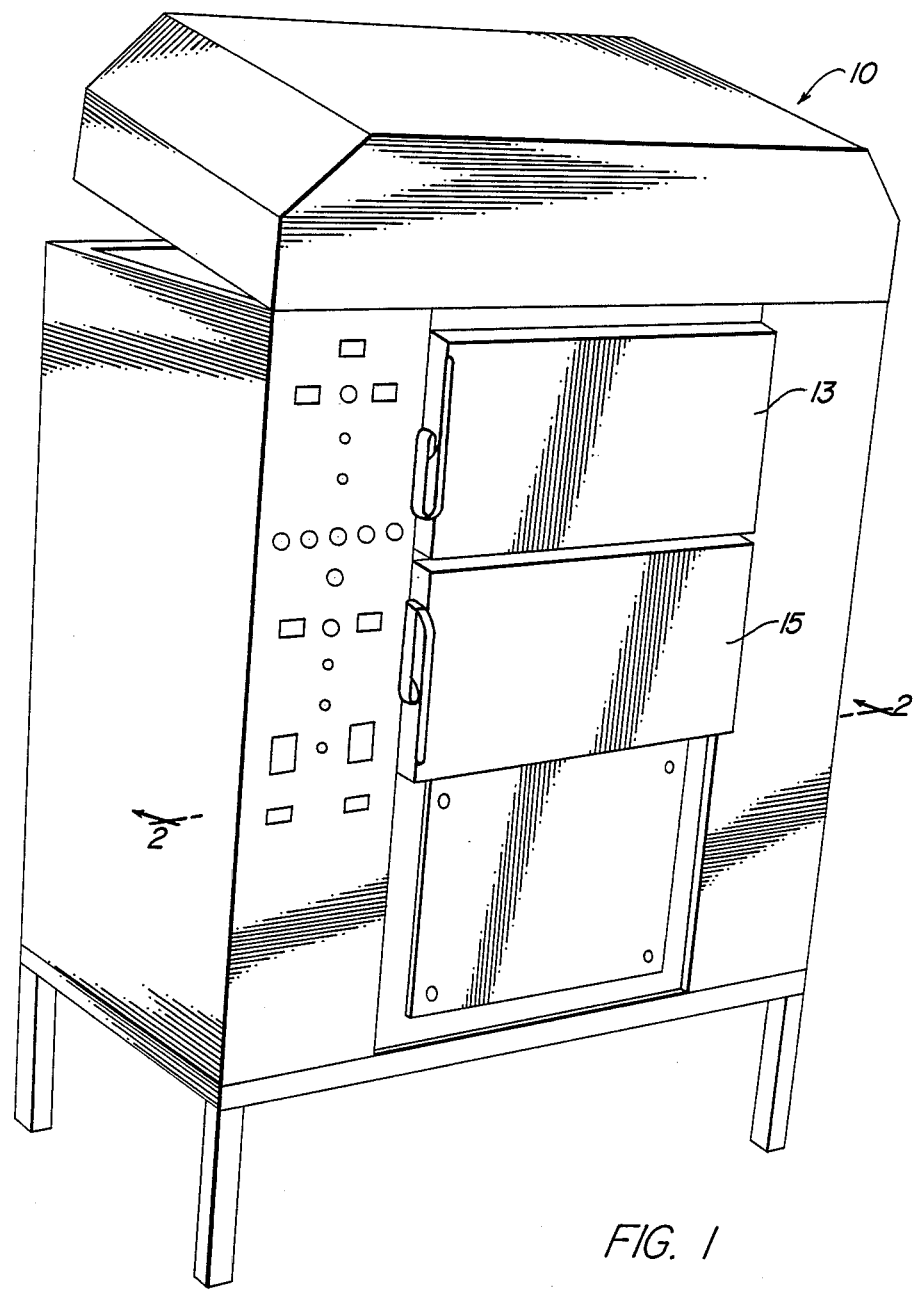
FIG. 1 is a perspective view illustrating the front and left side of the cooking apparatus.

Referring to FIG. 1 of the drawing the numeral 10 generally designates a multi-unit cooking apparatus embodying the invention. As illustrated in FIGS. 1, 2, 3 and 4, cooking apparatus 10 comprises a first cooking cavity closed by an access door 13, a second cooking cavity 14 closed by a second access door 15, each cooking cavity 12 and 14 having a hot plate unit 16, microwave heating unit 18 and an air circulating unit 20.

Figure 7:
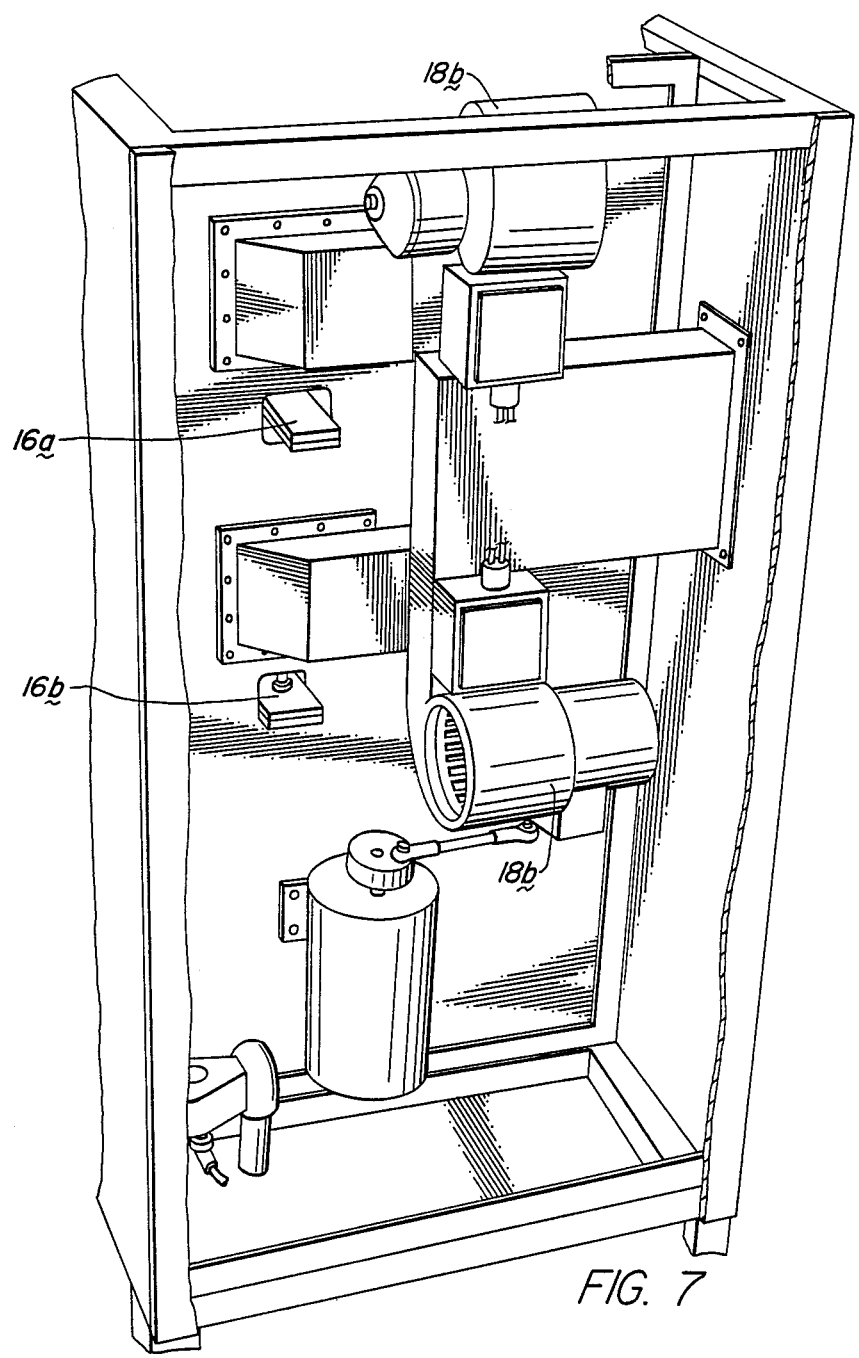
FIG. 7 is a perspective view of a right side of the cooking apparatus, an access door being in an open position.

Each hot plate unit 16 preferably comprises a sheet of thermal conductive material through which electrical heating elements are secured. The upper surface of the sheet is preferably treated to provide a non-sticking surface. Such can be accomplished by bonding tetrafloroethylene, which is commercially available under the registered trademark "TEFLON" from E. I. du Pont de Nemours & Company. A suitable hot plate unit is commercially available from General Electric Company and is provided with an electric plug and socket to facilitate removal of the hot plate for cleaning. As illustrated in FIG. 7 of the drawing, a pair of electrical plugs 16a and 16b are connected to electrical conductors for delivering electrical current to the hot plates 16 in the first and second cooking cavities 12 and 14.

Figure 2:
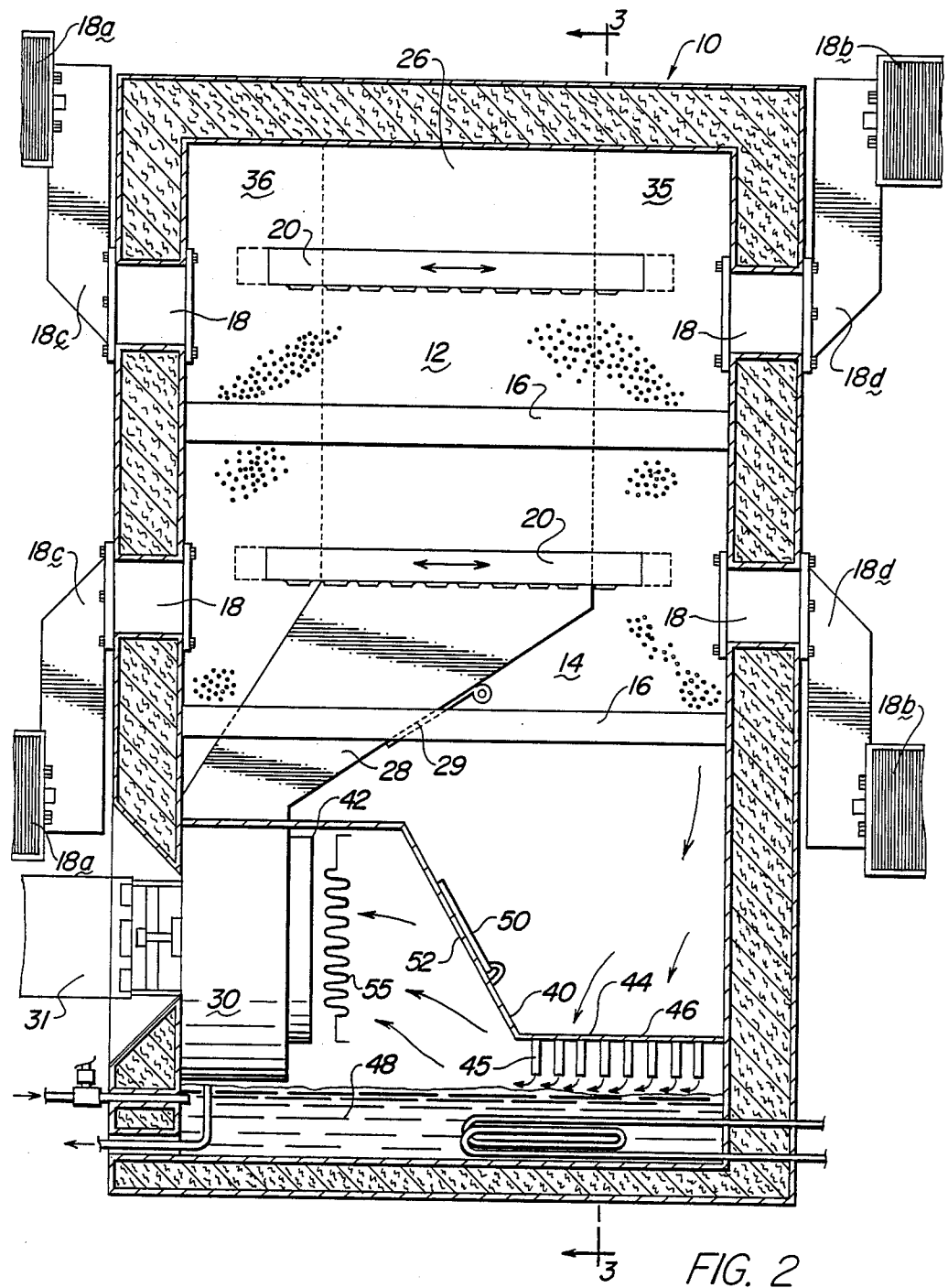
FIG. 2 is a cross-sectional view taken along line 2—2 of FIG. 1.
Figure 3:
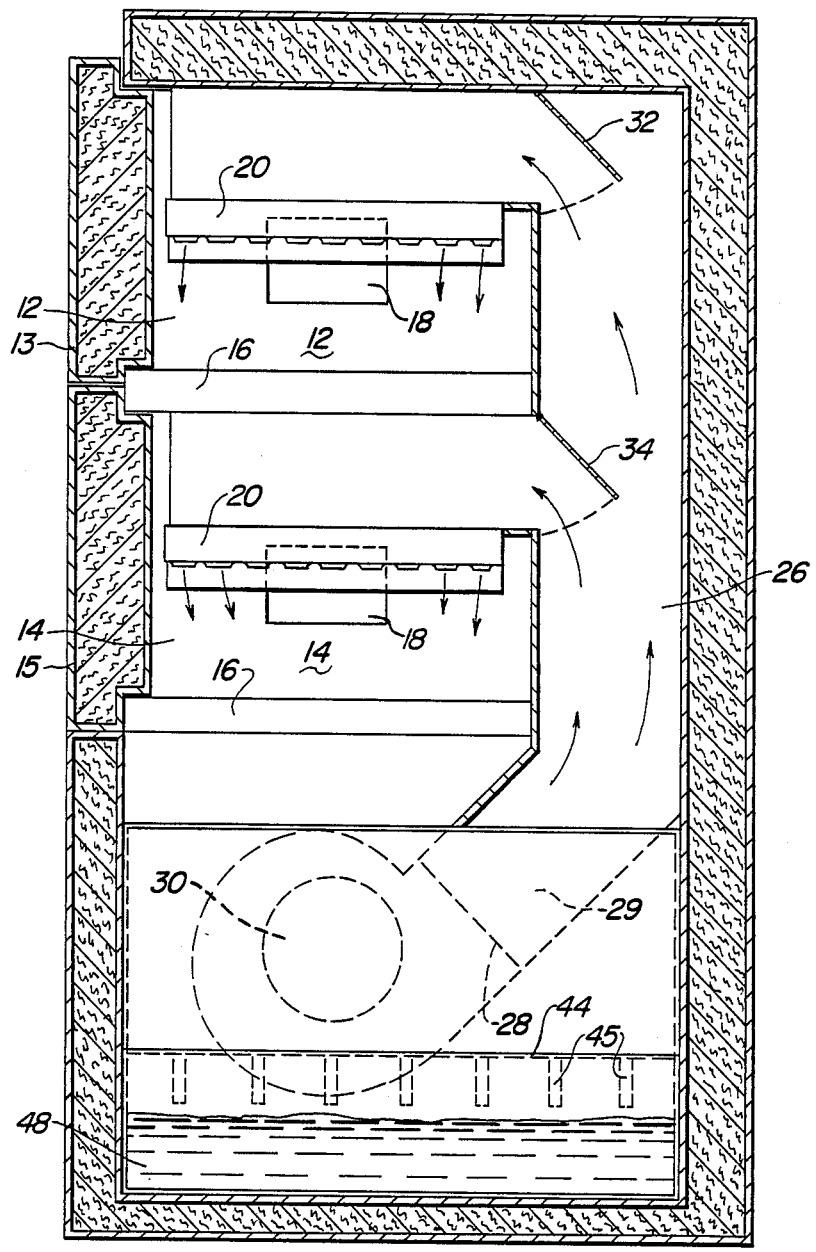
FIG. 3 is a cross-sectional view taken along line 3—3 of FIG. 2.
Figure 4:
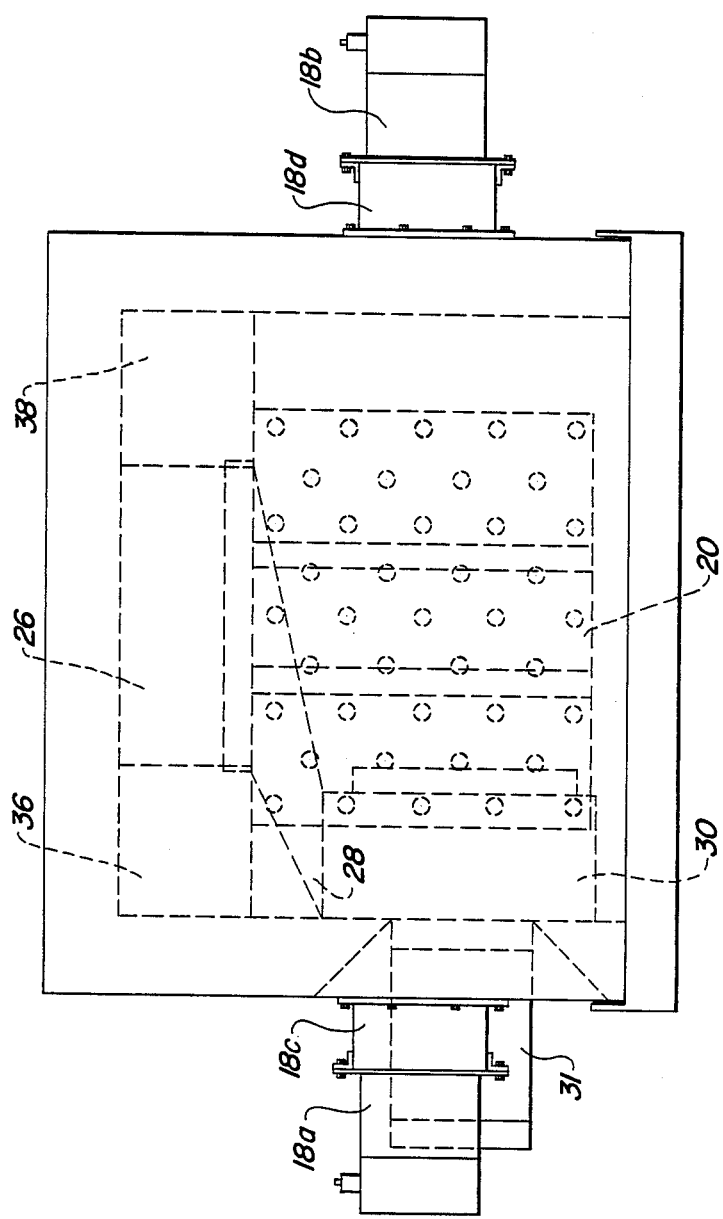
FIG. 4 is a top plan view.
Figure 5:
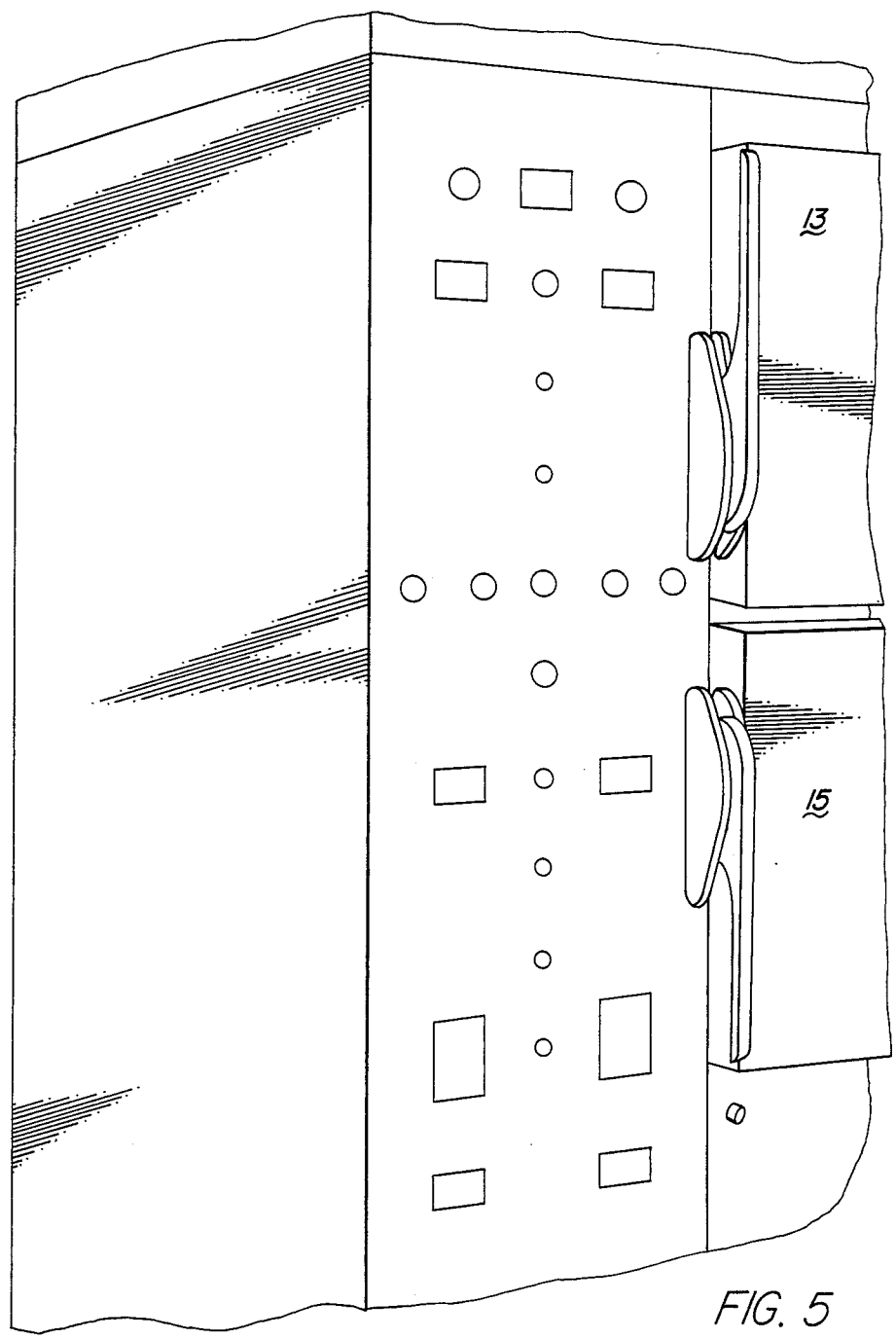
FIG. 5 is an enlarged fragmentary perspective view of the front of the cooking apparatus illustrating control apparatus.
Figure 6:
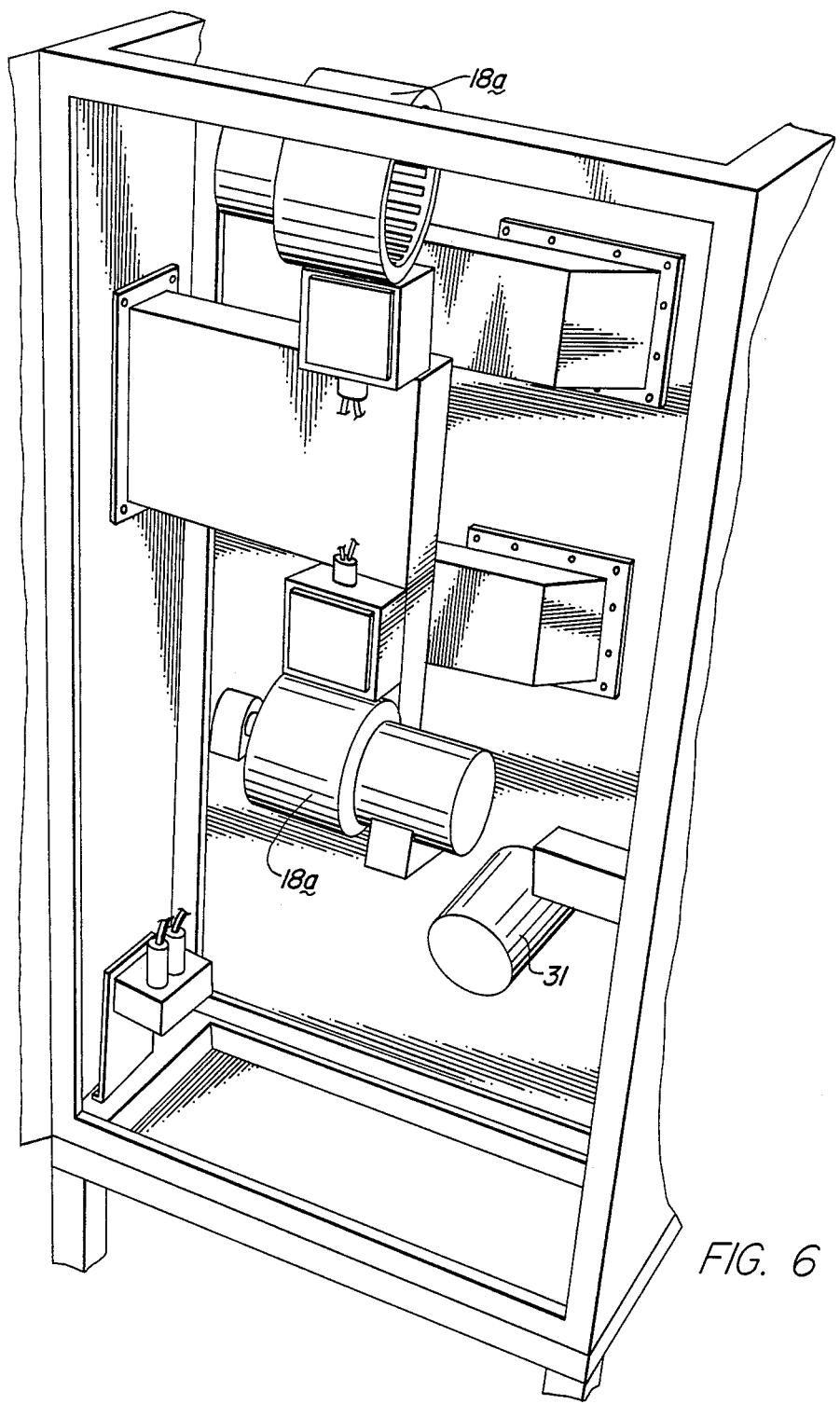
FIG. 6 is a perspective view of the left side of the cooling apparatus, an access door being in an open position to illustrate a programmable control apparatus.

Each microwave unit 18 comprises a pair of magnetrons 18a and 18b which deliver energy through wave guides 18c and 18d through openings 18 adjacent opposite sides of each of the cooking cavities 12 and 14. As illustrated in FIGS. 2 and 3, it should be readily apparent that microwave energy is introduced into opposite sides of each cavity 12 and 14 which provides an improved heating pattern.

Each air circulating unit 20 is connected to a plenum 26 which communicates with the pressure side 28 of a blower or other air impeller 30. Air impeller 30 is driven by a motor 31.

Figure 13:
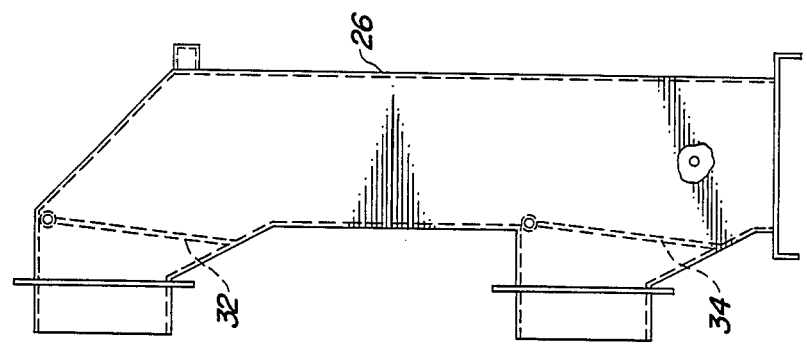
FIG. 13 is a side elevational view of the plenum.
Figure 12:
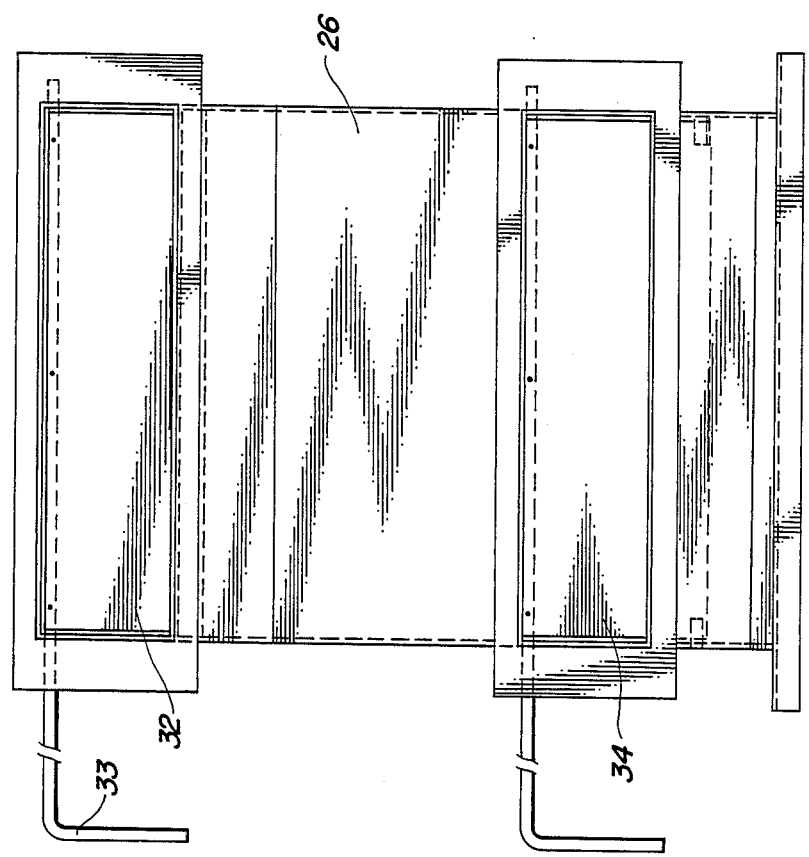
FIG. 12 is a front elevational view of the plenum.

A gate 32 is mounted between plenum 26 and air circulating unit 20 in the first cooking cavity 12 and a second gate 34 is mounted between plenum 26 and air circulating unit 20 in the second cooking cavity 14. As will be hereinafter more fully explained, gates 32 and 34 are mounted to be actuated independently to control air flow into cooking cavities 12 and 14 and are operable from an open position illustrated in FIG. 3 of the drawing to a closed position for "pulsing" flow of air into chambers 12 and 14. As illustrated in FIGS. 12-14, each gate 32 and 34 has an actuating rod 33 secured to rotate the gate about a hinge pin.

As best illustrated in FIG. 2 of the drawing, a pair of spaced air return ducts 36 and 38 extend along opposite sides of plenum 26 to cause air delivered through circulating unit 20 to flow in opposite directions from a central portion of each cavity 12 and 14 to returns 36 and 38 adjacent end walls of the cooking cavities.

Figure 8:
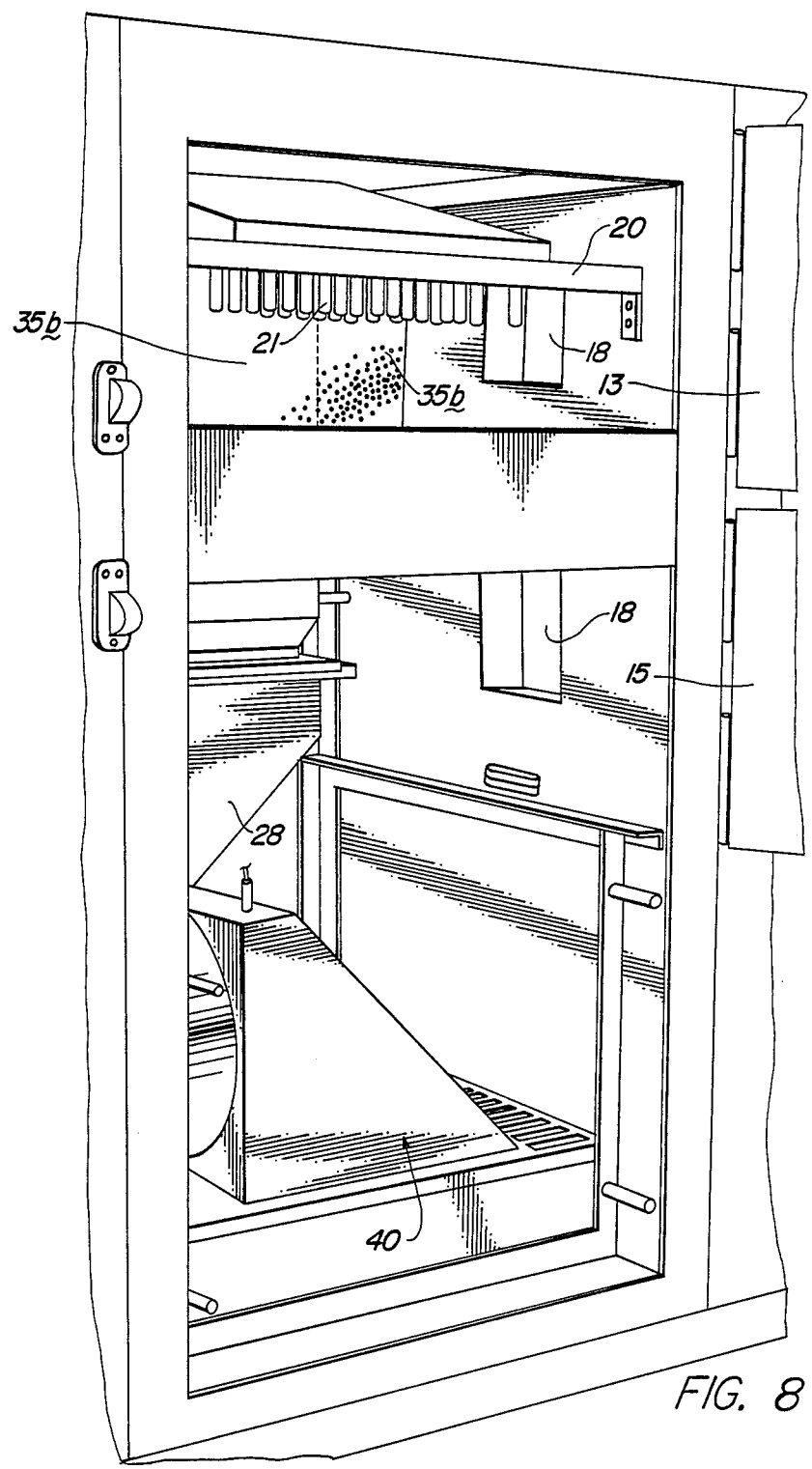
FIG. 8 is a fragmentary front perspective view with cooking cavity doors being in an open position and an access panel being removed to illustrate details of construction of the interior of the unit.
Figure 9:
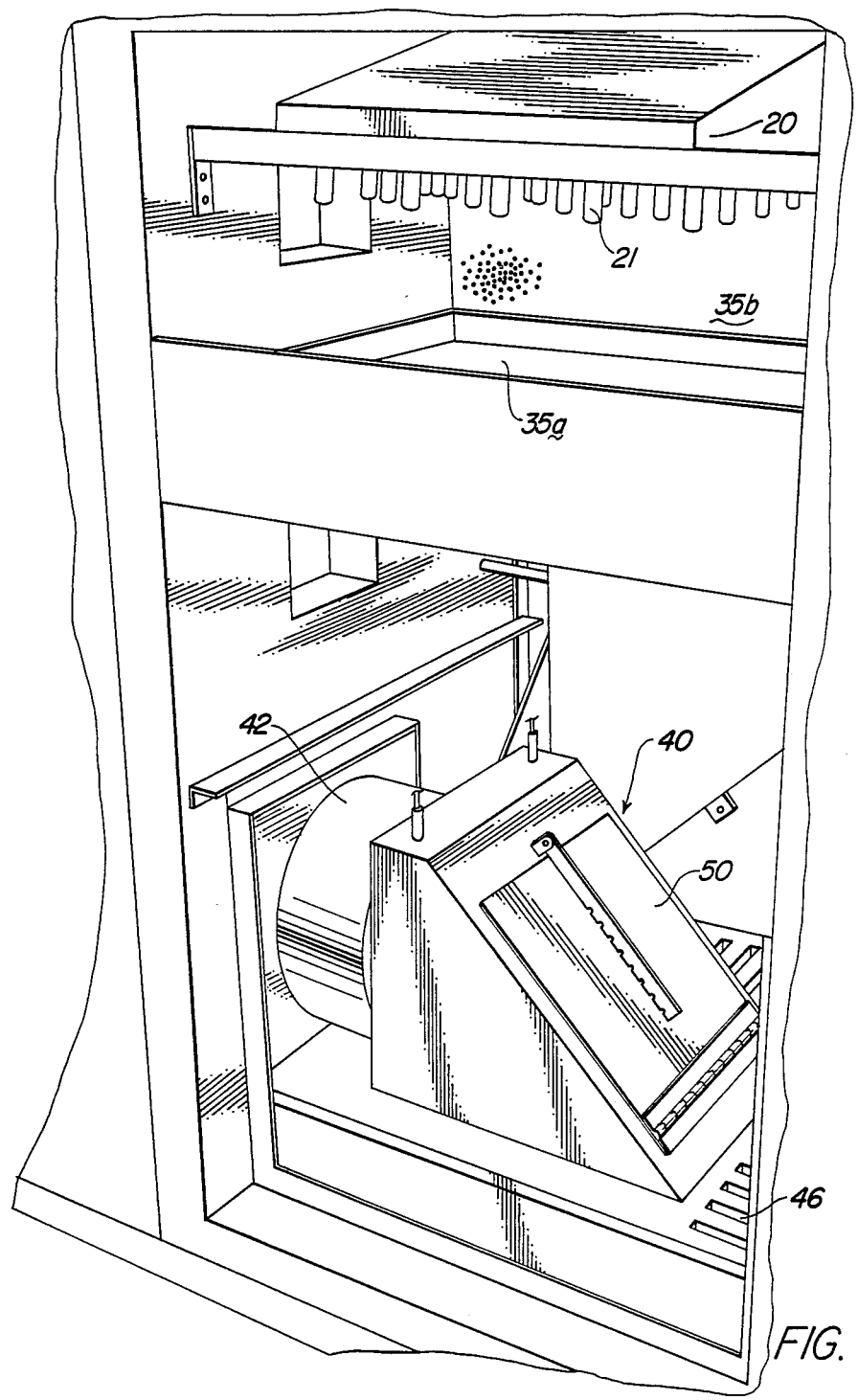
FIG. 9 is a fragmentary perspective view of a front portion of the cooking apparatus similar to FIG. 8 illustrating the air circulating apparatus.
Figure 10:
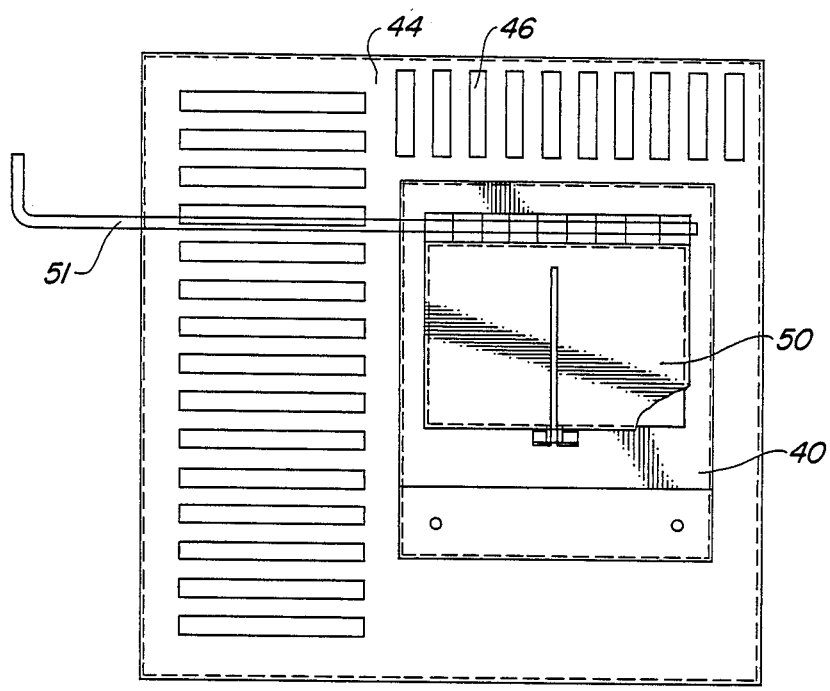
FIG. 10 is a top plan view of the gathering housing.
Figure 11:
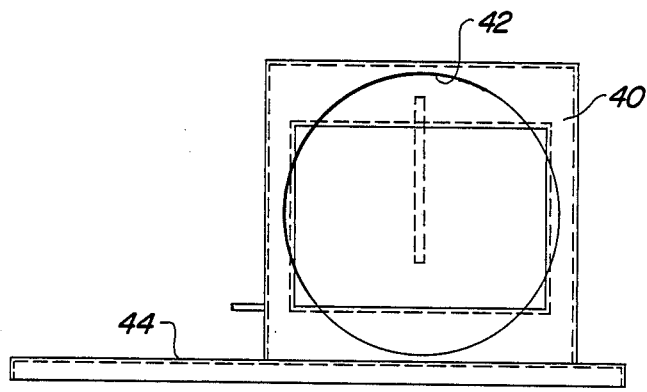
FIG. 11 is a side elevational view of the gathering housing.
Figure 16:
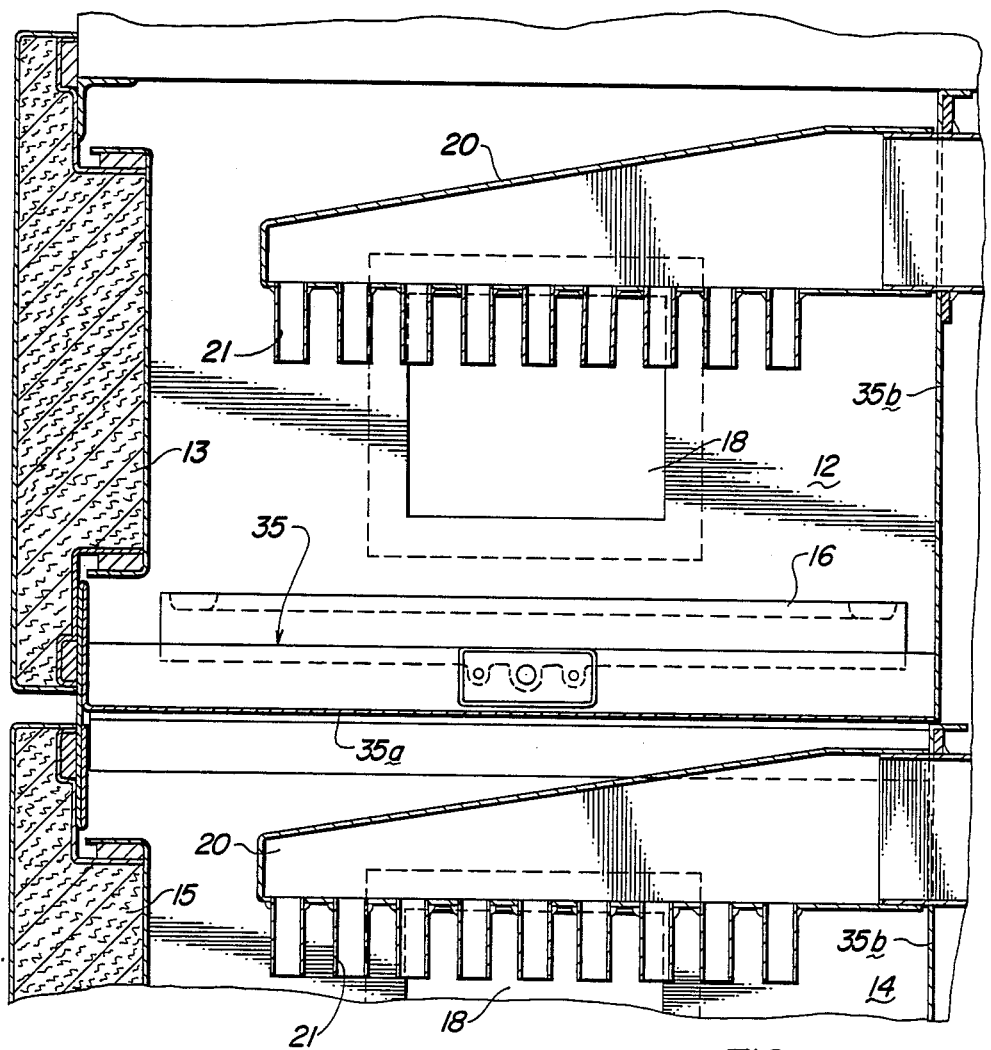
FIG. 16 is a fragmentary cross-sectional view illustrating the mounting of the air gathering unit on the plenum.

As illustrated in FIGS. 8, 9 and 16, a removable cavity liner 35 is mounted in each cavity 12 and 14 to form a floor 35a and a perforated back-wall 35b through which return air flows to return ducts 36 and 38. As will be hereinafter more fully explained, a by-pass damper is mounted in distribution duct 28 which extends between the pressure side of impeller 30 and plenum 26. By-pass damper 29 covers an opening in distribution duct 28 and is preferably spring urged to a closed position.

An air return gathering housing 40 is mounted between air return ducts 36 and 38 and the intake side of impeller 30. As best illustrated in FIGS. 2, 9, 10 and 11 of the drawing, gathering housing 40 comprises a shroud 42 connectable to the intake of impeller 30. A grate section 44, having baffles 45 extending downwardly from passages 46, directs return air downwardly to impinge against the surface of water 48 in a water tray as will be hereinafter more fully explained. An air scoop 50 is pivotally secured to cover an opening 52 formed in a wall of gathering housing 40 and is remotely controlled by an actuating arm 51 and solenoid outside the cabinet to rotate the scoop 50.

It should be readily apparent that air passing from return ducts 36 and 38 will flow through openings 46 and will be directed by baffles 45 to impinge against the surface of water 48 as it is drawn into impeller 30. However, if air scoop 50 is opened, air will be drawn directly from return ducts 36 and 38 to the intake of impeller 30 significantly reducing air flow through passages 46 to prevent impingement of the return air with the surface of water 48. It should be readily apparent that actuation of air scoop 50 controls the humidity or moisture content of air circulating through the system. An electric heating element 55 is mounted adjacent the inlet of impeller 30 and is controlled through a thermostat (not shown) to control the temperature of air delivered through each air circulating unit into cavities 12 and 14.

Figure 18:
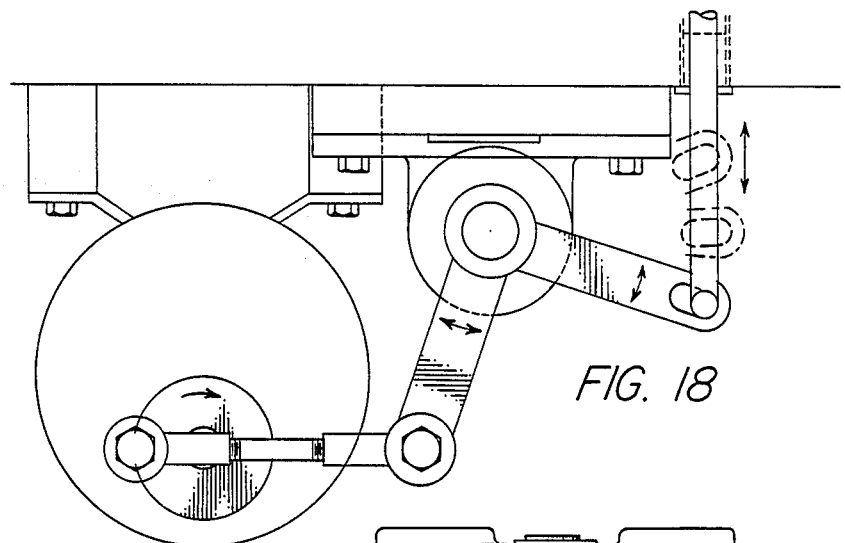
FIG. 18 is a plan view of the mechanism illustrated in FIG. 17.
Figure 17:
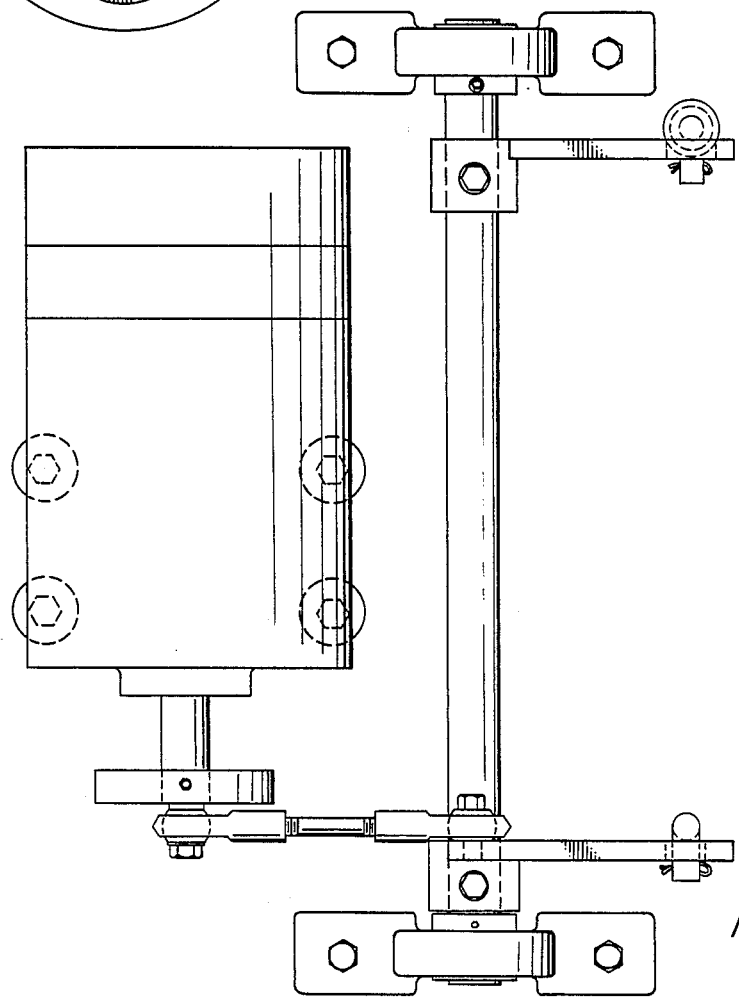
FIG. 17 is a diagrammatic view illustrating the mechanism for oscillating the air gathering units.

Air circulating units are illustrated in FIG. 16 and include a tapered duct to direct streams of air through tubes 21. Each duct is oscillated relative to plenum 26 by the mechanism illustrated in FIGS. 17 and 18 which include an electric motor rotating a crank disc which imparts oscillating motion through a link to bell cranks secured to an actuating shaft. The bell cranks are connected to an arm which extends through the side wall of the cabinet and is secured to the tapered duct 20.

The multiple cavity oven incorporates a central air heating and recirculating section. The multiple cavities and the continually reciprocating air provided reservoir which makes the condensation heat transfer much more effective than if the volume of air within a single cavity were employed.

Figure 19:
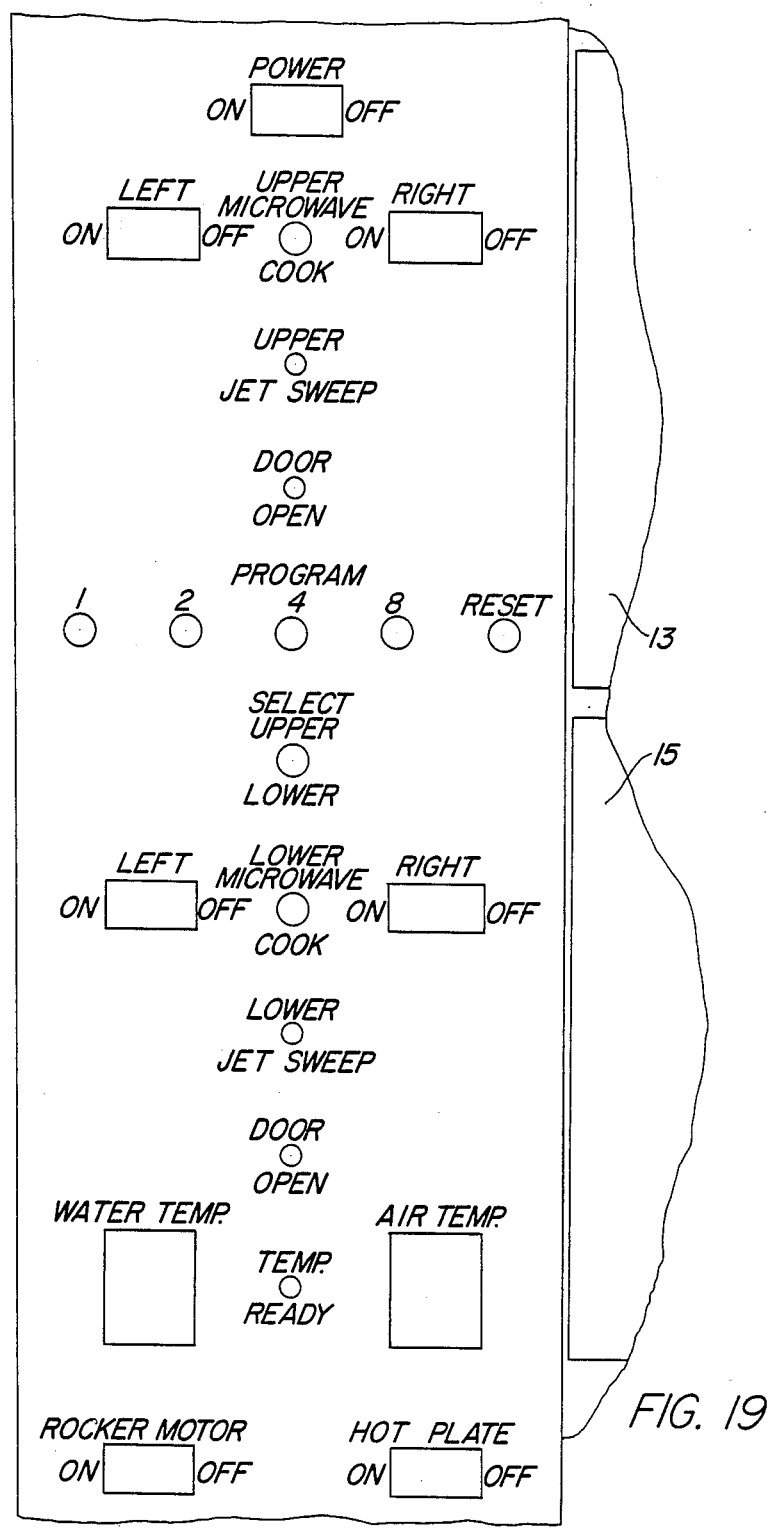
FIG. 19 is an enlarged diagrammatic view illustrating the layout of the control mechanism illustrated in FIG. 5.

As diagrammatically illustrated in FIG. 19 of the drawing, mechanism is provided to permit programming each of the heating units within each cavity. The hot plate or grill 16 is controlled by a thermostat to maintain the grill at a desired temperature to heat the bottom surface of a food product. Air flow through air recirculating units 20 is regulated by gates 32 and 34 which are opened and closed for a programmable duration to provide continuous air flow; early or late air flow; or pulsating bursts of air flow depending on the surface heating and moisture content which is required to provide optimum results for a particular food product. Each microwave unit 18 is controllable by a timer or temperature sensing mechanism to provide either constant or pulsed heating.

After food product has been heated to a desired temperature level, pulses recirculating air through units 20 may be employed to keep the food item hot and by controlling air scoop 30 to the surface of the product may be maintained dry or moist as desired.

A lifting mechanism (not shown) is preferably employed to engage the lip of a container sitting on grill 16 for elevating the bottom of the container from the surface of the grill to reduce heating from the grill. The lift frame is programmed with the other heating controls to hold the food item in the cavity with slow heating, (spaced off grill, pulsed air recirculation, pulsed microwave) to preserve (over 140° F.) or to thaw.

The rapidly operating gates 32 and 34 control the recirculating air and can be programmed to heat by condensation when the product surface is below the dewpoint. The surface can be dried, crisped and browned by intensive air jet impingement. If a moist surface is desired, the recirculating air can be pulsed to supply very moderate heating to supply heat necessary to warm the interior, but not sufficient to dry the surface.

Having described the invention, we claim:

1. An oven comprising: first and second cooking cavities; air recirculating means for drawing air from each of said first and second cooking cavities and for selectively delivering air to each said cooking cavity; means controlling the temperature of recirculating air; a tray of water; means to control the temperature of said water; means directing a portion of said recirculating air to impinge against the surface of said water; humidity control means to adjust the proportion of recirculating air delivered to said directing means for controlling humidity of air circulated through the cavities; and control means to regulate air flow through said recirculating means to each of said cavities to provide controlled pulses of air of controlled temperature and humidity through one cooking cavity wherein the total volume of air recirculated through said plurality of cooking cavities is significantly greater than the volume of said one cavity to provide a reservoir of moist air having sufficient volume to permit condensation of moisture from the air onto the surface of a food product in said one cooking cavity having a temperature less than the dewpoint of the air without significantly changing the dewpoint of the total reservoir of moist air in said plurality of cooking cavities.

2. An oven according to claim 1 with the addition of microwave heating means adapted to heat a food product in each of said cooking cavities.

3. An oven according to claim 1 with the addition of a grill in each of said heating cavities; and heater means associated with each said grill for heating the bottom of a food product supported by said grill.

4. An oven according to claim 3 with the addition of microwave heating means adapted to heat a food product in each of said cooking cavities.

5. An oven comprising: a cabinet having a plurality of cooking cavities; heater means controlling the temperature of air in said cavities; a plenum; a blower having a suction side connected to draw air from each of said plurality of cooking cavities and having a pressure side connected to deliver hot air to said plenum; a plurality of gates communicating with said plenum, each of said gates communicating with one of said cooking cavities; actuating means operably connected to each of said gates to independently actuate each gate to control air flow into each cooking cavity; humidity control means for controlling humidity of air circulated through the cavities; and control means to regulate air flow through said plenum to provide controlled pulses of air of controlled temperature and humidity through a single cooking cavity wherein the total volume of air recirculated through said plurality of cooking cavities is significantly greater than the volume of said single cavity to provide a reservoir of moist air having sufficient volume to permit condensation of moisture from the air onto the surface of a food product in one of said cavities having a temperature less than the dewpoint of the air without significantly changing the dewpoint of the total volume of the reservoir of moist air in the plurality of cavities.

6. An oven according to claim 5, said actuating means being operable to move each of said gates from an open position to a closed position for pulsing the flow of air into the respective cooking cavities.

7. An oven according to claim 6 with the addition of a pair of spaced air return ducts extending along opposite sides of said plenum, said return ducts being positioned to cause air delivered through each cooking cavity to flow in opposite directions from a central portion of the cooking cavity and return to said blower means.

8. An oven comprising: a caking cavity; plenum means communicating with said cooking cavity; air recirculating means for drawing air through said air return means from said cooking cavity; means controlling the temperature of recirculating air in said return means; a tray of water; means to control the temperature of water in said tray; means directing a portion of said recirculating air to impinge against the surface of said water; humidity control means to adjust the proportion of recirculating air delivered to said directing means for controlling humidity of air circulated through the cooking cavity; and control means to regulate air flow through said recirculating means to provide controlled pulses of air of controlled temperature through said cooking cavity.

9. An oven comprising: first and second cooking cavities; plenum means communicating with each of said cooking cavities; an air return means communicating with each of said cooking cavities; air recirculating means for drawing air through said air return means from said cooking cavity; a tray of water; means to control the temperature of said water; means directing a portion of said recirculating air to impinge against the surface of said water; humidity control means to adjust the proportion of recirculating air delivered to said directing means for controlling humidity of air circulated through the cooking cavities; means controlling the temperature of recirculating air in said return means; and control means to regulate air flow through said recirculating means to each of said cavities to provide controlled pulses of air of controlled temperature through one cooking cavity wherein the total volume of air recirculated through said plurality of cooking cavities is significantly greater than the volume of said one cavity to provide a reservoir of heated air having sufficient volume to permit transfer of heat to a food product in said one cooking cavity without significantly changing the temperature of the total reservoir of heated air in said plurality of cooking cavities.

10. An oven according to claim 8 with the addition of microwave heating means adapted to heat a food product in said cooking cavity.

11. An oven according to claim 8 with the addition of heater means in said cooking cavity for heating the bottom of a food product in said cooking cavity.

12. An oven according to claim 11 with the addition of microwave heating means adapted to heat a food product in said cooking cavity.

13. An oven comprising: a cabinet having a plurality of cooking cavities; heater means controlling the temperature of air in said cavities; a plenum; a blower having a suction side connected to draw air from each of said plurality of cooking cavities and having a pressure side connected to deliver hot air to said plenum; a plurality of gates communicating with said plenum, each of said gates communicating with one of said cooking cavities; actuating means operably connected to each of said gates to independently actuate each gate to control air flow into each cooking cavity; and control means to regulate air flow through said plenum to provide controlled pulses of air of controlled temperature through a single cooking cavity wherein the total volume of air recirculated through said plurality of cooking cavities is significantly greater than the volume of said single cavity to provide a reservoir of heated air having sufficient volume to permit a transfer of heat from the air to a food product in one of said cavities having a temperature less than the temperature of a food product in another cavity without significantly changing the temperature of the total volume of the reservoir of heated air in the plurality of cavities.

14. An oven according to claim 13, said actuating means being operable to move each of said gates from an open position to a closed position for pulsing the flow of air into the respective cooking cavities.

15. An oven according to claim 13 with the addition of a pair of spaced air return ducts extending along opposite sides of said plenum, said return ducts being positioned to cause air delivered through each cooking cavity to flow in opposite directions from a central portion of the cooking cavity and return to said blower means.

16. An oven according to claim 15, with the addition of: humidity control means in said return ducts for controlling humidity of air circulated through the cavities.

17. An oven according to claim 16, said humidity control means comprising: a tray of water; means to control the temperature of said water; means directing a portion of said recirculating air to impinge against the surface of said water; humidity control means to adjust the proportion of recirculating air delivered to said directing means for controlling humidity of air circulated through the cavities.

18. An oven comprising: a cabinet having a plurality of cooking cavities; a plenum; a pair of spaced air return ducts extending along opposite sides of said plenum, said return ducts being positioned to cause air delivered through each cooking cavity to flow in opposite directions from a central portion of the cooking cavity and return to said blower means; heater means between said air return ducts and said blower, said blower having a suction side connected to draw air from each of said plurality of cooking cavities through said spaced air return ducts and having a pressure side connected to deliver hot air to said plenum; a plurality of gates communicating with said plenum, each of said gates communicating with one of said cooking cavities; actuating means operably connected to each of said gates to independently actuate each gate to control air flow into each cooking cavity; and control means to regulate air flow through said plenum to provide controlled pulses of air of controlled temperature through a single cooking cavity wherein the total volume of air recirculated through said plurality of cooking cavities is significantly greater than the volume of said single cavity to provide a reservoir of heated air having sufficient volume such that the transfer of heat from the air to a food product in one of said cavities will not significantly change the temperature of the total volume of the reservoir of heated air in the plurality of cavities.

19. An oven according to claim 18, said actuating means being operable to move each of said gates from an open position to a closed position for pulsing the flow of air into the respective cooking cavities.

20. An oven according to claim 18 with the addition of microwave heating means adapted to heat a food product in each of said cooking cavities.

21. An oven according to claim 18 with the addition of a grill in each of said heating cavities; and heater means associated with each said grill for heating the bottom of a food product supported by said grill.

22. An oven according to claim 19 with the addition of: a source of temperature controlled water; means directing a portion of said recirculating air to impinge against the surface of said water; humidity control means to adjust the proportion of recirculating air delivered to said directing means for controlling humidity of air circulated through the cavities.

* * * * *

UNITED STATES PATENT AND TRADEMARK OFFICE
CERTIFICATE OF CORRECTION

PATENT NO. : 4,835,351

DATED : May 30, 1989

INVENTOR(S) : Donald P. Smith et al

It is certified that error appears in the above-identified patent and that said Letters Patent is hereby corrected as shown below:

Column 1, line 60, change "cooling" to -- cooking --;
Column 4, line 14, change "pulses" to -- pulsed --;
Column 4, line 17, delete "to"; and
Column 5, line 40, change "caking" to -- cooking --.

Signed and Sealed this

Twentieth Day of February, 1990

Attest:

JEFFREY M. SAMUELS

*Attesting Officer*    *Acting Commissioner of Patents and Trademarks*